United States Patent [19]

Skinner

[11] Patent Number: 4,839,022

[45] Date of Patent: Jun. 13, 1989

[54] METHOD AND APPARATUS FOR TREATING OIL-WATER-SOLIDS SLUDGES AND REFINERY WASTE STREAMS

[75] Inventor: James L. Skinner, Plano, Tex.

[73] Assignee: Atlantic Richfield Company, Los Angeles, Calif.

[21] Appl. No.: 796,349

[22] Filed: Nov. 8, 1985

Related U.S. Application Data

[63] Continuation-in-part of Ser. No. 677,658, Dec. 3, 1984, abandoned.

[51] Int. Cl.$^4$ .............................................. C106 17/00
[52] U.S. Cl. ........................................ 208/13; 208/3; 210/901; 210/912; 210/770; 210/771; 585/240; 175/206; 175/207; 175/66; 423/53
[58] Field of Search ................ 208/13, 3; 405/128, 405/129; 210/901, 912, 770, 771; 585/240; 423/53; 175/206, 207, 66; 110/346

[56] References Cited

U.S. PATENT DOCUMENTS

| | | | |
|---|---|---|---|
| 3,570,420 | 3/1971 | Lewis et al. | 110/346 |
| 3,692,668 | 9/1972 | McCoy et al. | 208/13 |
| 4,071,432 | 1/1978 | Knell et al. | 585/240 |
| 4,139,462 | 2/1979 | Sample, Jr. | 210/72 |
| 4,142,912 | 3/1979 | Young | 210/912 |
| 4,151,257 | 4/1979 | Müller et al. | 423/53 |
| 4,208,285 | 6/1980 | Sample, Jr. | 210/180 |
| 4,209,381 | 6/1980 | Kelly, Jr. | 208/8 |
| 4,222,988 | 9/1980 | Barthel | 422/309 |
| 4,232,614 | 11/1980 | Fitch et al. | 110/346 |
| 4,260,473 | 4/1981 | Bauer | 585/240 |
| 4,268,188 | 5/1981 | Bertus et al. | 405/129 |
| 4,276,115 | 6/1981 | Greenfield et al. | 210/770 |
| 4,319,410 | 3/1982 | Heilhecker et al. | 34/75 |
| 4,360,380 | 11/1982 | Zarier | 110/346 |
| 4,370,233 | 1/1983 | Hayes et al. | 210/901 |
| 4,387,514 | 6/1983 | McCaskill, Jr. | 34/31 |
| 4,404,105 | 9/1983 | de Loc Kerente | 210/912 |
| 4,409,020 | 10/1983 | Holman, Jr. et al. | 210/912 |
| 4,409,909 | 10/1983 | Tomizawa et al. | 110/346 |
| 4,411,074 | 10/1983 | Daly | 34/32 |
| 4,424,081 | 1/1984 | Giguere | 175/206 |
| 4,453,319 | 6/1984 | Morris | 34/1 |
| 4,536,286 | 8/1985 | Nagent | 175/206 |
| 4,683,963 | 8/1987 | Skinner | 175/66 |

FOREIGN PATENT DOCUMENTS

| | | | |
|---|---|---|---|
| 0005273 | 11/1979 | European Pat. Off. | 175/206 |
| 3423620 | 1/1986 | Fed. Rep. of Germany | 210/771 |
| 0053767 | 4/1977 | Japan | 210/912 |
| 1148105 | 5/1981 | Japan | 423/53 |
| 0202799 | 10/1985 | Japan | 210/771 |

*Primary Examiner*—H. M. S. Sneed
*Assistant Examiner*—Helane Myers
*Attorney, Agent, or Firm*—Michael E. Martin

[57] ABSTRACT

Heavy hydrocarbon containing sludges such as refinery waste streams, oil storage tank sludges and marine oil tanker ballast are treated by passing the sludges in a flow stream through an indirect dryer to vaporize liquids having a boiling point at atmospheric pressure of less than about 700° F. and to provide substantially dried solid particles discharged from the dryer. The dried particles, containing heavy hydrocarbons as a coating or as a part of the solids, are conducted to a combustor/oxidizer and exposed to a high velocity flow stream of oxygen containing gas, typically low pressure forced air, to burn the residual hydrocarbons in the solids and to reduce heavy metals and the like to oxides thereof. A sludge handling system includes a rotary disk type indirect dryer connected to a lift pipe type combustor/oxidizer for thorough exposure of the dried solids to an oxygen containing atmosphere. A centrifigal or cyclone type gas-solids separator receives the flow stream discharged from the lift pipe and a portion of the dried solids may be diverted after discharge from the dryer back to the dryer inlet to reduce the moisture content of the sludge flow stream introduced to the dryer to minimize caking and clogging of the dryer itself.

7 Claims, 1 Drawing Sheet

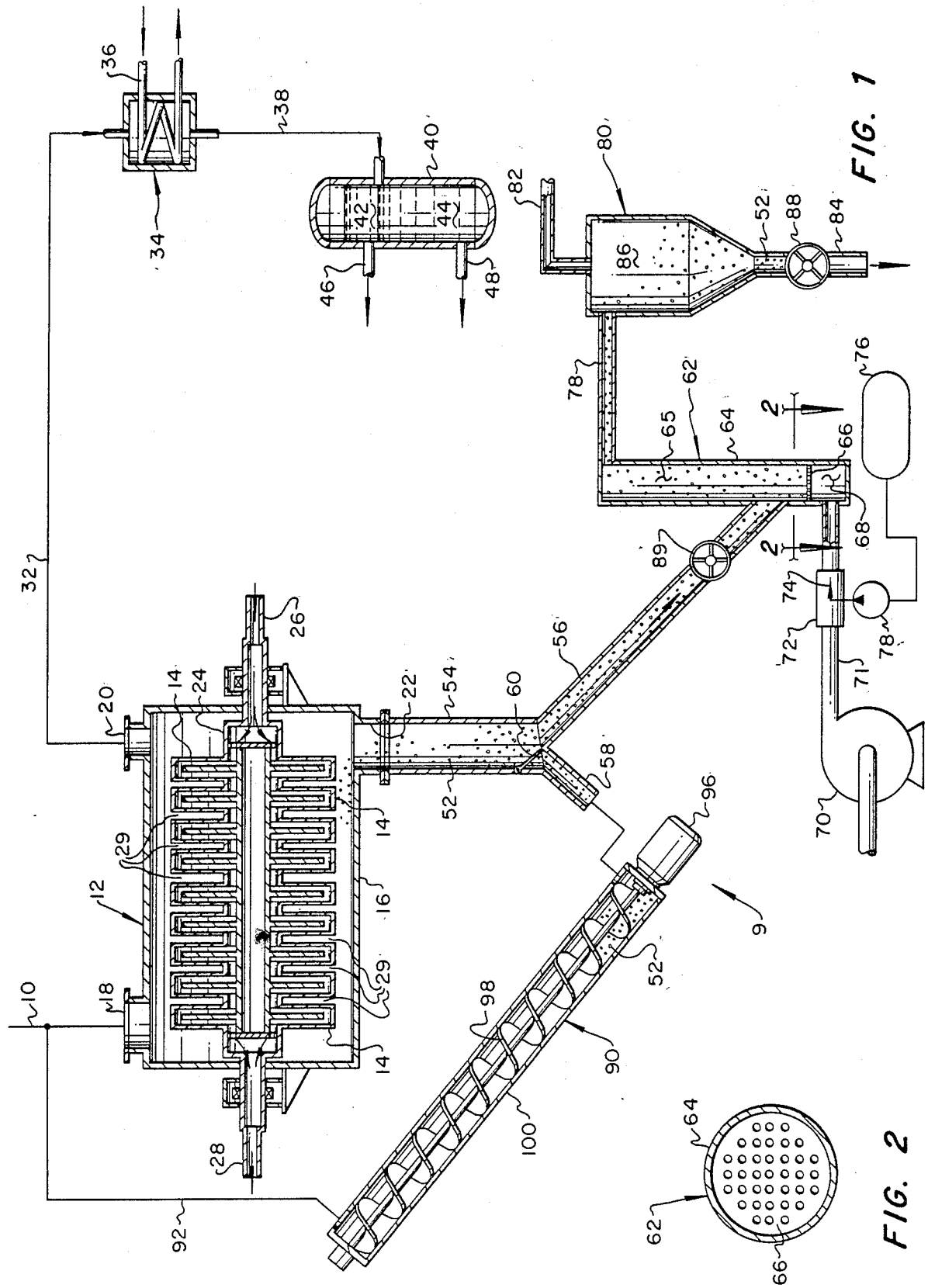

METHOD AND APPARATUS FOR TREATING OIL-WATER-SOLIDS SLUDGES AND REFINERY WASTE STREAMS

CROSS REFERENCE TO RELATED APPLICATION

This Application is a continuation in part of U.S. patent application Ser. No. 677,658 filed Dec. 3, 1984 now abandoned.

BACKGROUND OF THE INVENTION

1. Field of the Invention

The present invention pertains to a method and apparatus for treating sludges containing solids and relatively heavy hydrocarbonaceous liquids of the types typically existing in crude oil transport and refinery operations, for example.

2. Background

In the continuing effort to recover hydrocarbons and prepare waste materials from various operations involving hydrocarbon fluids for disposal in accordance with environmentally safe practices, several problems remain in connection with the suitable disposal of waste substances generated in crude oil refinery operations, cleaning and refurbishing oil storage tanks and cleaning and treating storage tank wash down solutions and marine tanker ballast, for example.

In my prior application referenced hereinabove, an improved method and apparatus has been developed for treating slurries containing oil, water and solids such as are generated in the drilling of subterranean wells. In treating well drilling fluids, for example, the slurry that results from the drill cuttings separation process can be suitably treated by introducing the slurry to an indirect dryer apparatus and distilling or vaporizing the liquids, primarily comprising water and refined petroleum liquids which have been purposely added to drilling fluids. The temperatures at which conventional indirect dryers may operate suitably provide for vaporization of the oils used in oil based drilling muds, for example, so that the dried solids discharged from the indirect dryer are substantially free from the hydrocarbonaceous materials. Moreover, these solids are typically materials that have been withdrawn from the earth and have not been previously treated or converted into materials which are toxic or otherwise harmful.

However, in a continuing effort to develop suitable treatment processes for handling and converting waste materials from refinery operations, oil storage tanks, marine tankers and other sources, it has been particularly difficult to convert all of the hydrocarbon materials and to provide conversion of solids in these wastes into relatively harmless materials. For example, many oil refinery waste streams include relatively heavy residual hydrocarbon substances which cannot be distilled at atmospheric conditions below temperatures of about 700° F. Refinery waste sludges, storage tank sediments and sludges, and marine tanker ballast water solutions, for example, also often contain quantities of relatively toxic solids of heavy metals such as chromium, vanadium, nickel and other materials which cannot be returned to the environment safely using the processes described in the abovereferenced application or other prior art processes.

Accordingly, the present invention is directed to a method and apparatus for distilling heavy oil sludges such as refinery waste streams, storage tank residual sludges, and marine tank ballast water solutions to distill the water and oil substances present in these materials and to convert the solid materials into oxides of the materials themselves and which are substantially free of any hydrocarbonaceous materials.

SUMMARY OF THE INVENTION

The present invention provides an improved method for treating heavy hydrocarbon sludges and the like, such as generated in oil refinery operations, in the cleaning of oil storage tanks, and in treating marine tanker waste fluids such as ballast water, by distilling the liquids in the sludges and by converting the solids to substantially hydrocarbon free oxides of the solids material.

In accordance with one aspect of the present invention, heavy oil sludges such as those generated in refinery operations, oil storage tank farms and marine tankers are exposed to an indirect drying operation to distill those liquids which may boil at temperatures in the range of 500° F. to 700° F. to produce substantially dried solids which may contain coatings of or comprise mixtures of heavier hydrocarbonaceous materials. These solids are then subjected to further treatment by an oxygen-rich environment to oxidize the heavy hydrocarbonaceous materials and to provide oxides of solids which may be deemed hazardous or toxic, such as heavy metals.

In accordance with another aspect of the present invention, there is provided a method and system for handling and treating sludges containing hydrocarbonaceous materials which will oxidize at temperatures in the range of 700° F. to 1100° F. and which sludges contain heavy metals such as chromium, vanadium, nickel, and other materials which may be oxidized by complete exposure to an oxygen containing gas. The treatment method includes exposing the sludge to an indirect dryer to distill water, hydrocarbon fluids, and other substances which boil at temperatures in the range of 500° F. to 700° F., discharging dried solids which are the residue of the distillation process, exposing said solids to an oxygen containing gaseous flow stream by passing said solids through a vertical lift pipe, or similar apparatus, which will thoroughly mix and expose the solids to oxygen at an elevated temperature, and finally separating said solids from said gaseous fluid and collecting or discharging said solids into the environment. In particular, the process and treatment system of the present invention provides for separating oils and water from refinery waste streams, oil storage tanks and for treating marine tanker ballast water to provide separated oil and water constituents and dried oxides of heavy metals.

In accordance with a still further advantageous aspect of the present invention, there is provided a system for treating sludges from oil refineries, oil storage tanks, marine tankers and similar types of waste sludges, said system including an indirect dryer into which said sludges are introduced initially for distillation of oils and water which typically boil under atmospheric condition in the range of 500° F. to 700° F. One form of indirect dryer comprises a rotary disk type dryer and the moisture content of the sludge may be advantageously reduced prior to or at introduction of the waste stream into the dryer by recycling and mixing the incoming sludge feed stream with dried solids previously separated out and discharged by the dryer. In this way, the accumulation of dried solid materials such as clays and the like are prevented on the surfaces of the dryer disks or similar structure.

The system of the present invention further includes a combustor/oxidizer for receiving dried solids having heavy hydrocarbon coatings thereon. The solids are exposed to a high velocity flow stream of relatively low pressure heated air in the combustor/oxidizer which, at the temperature of the solids as exposed to the air, provides for complete oxidation of the hydrocarbon materials mixed in or coated on the solids and to provide the formation of oxides of the solids materials, particularly where the solids include particles of heavy metals. The combustor/oxidizer may take various forms, primarily as it provides for rapid and thorough exposure of the solids at a high temperature in the range of 700° F. to 1100° F. to a relatively high velocity gaseous flow stream, preferably low pressure forced air, so that complete combustion of hydrocarbons and oxidation of oxidizable material in the solids takes place.

Those skilled in the art will recognize the above described features and advantages of the present invention as well as additional superior aspects thereof upon reading the detailed description which follows in conjunction with the drawing.

BRIEF DESCRIPTION OF THE DRAWING

FIG. 1 comprises a schematic diagram of a preferred embodiment of a system in accordance with the present invention; and FIG. 2 is a view taken from the line 2—2 of FIG. 1.

DETAILED DESCRIPTION OF PREFERRED EMBODIMENTS

In the description which follows, like parts are marked throughout the specification and drawing with the same reference numerals. The drawing figures are in substantially schematic form and representations of certain elements may be exemplary.

The handling of sludges generated in oil refineries, oil storage tank farms and at marine crude oil tanker loading and unloading facilities is a major problem giving consideration to the environmental impact of disposal of such sludges or slurries. The substances encountered in sludges and waste streams from oil refineries, oil storage tanks and marine tanker operations may contain significant quantities of high boiling temperature oils and other hydrocarbonaceous materials, that is, hydrocarbons and other oily substances having atmospheric boiling points in the range of 700° F. and higher. These sludges and waste streams typically also include at least small amounts of heavy metals, including chromium, vanadium, nickel and iron which cannot be suitably disposed of by landfill or other techniques without first being returned to their naturally occurring oxide state. Although the method and apparatus for cleaning oil and gas well drill cuttings, as described in the abovereferenced patent application, can remove the lower boiling point fractions of hydrocarbon fluids and other oils from the abovementioned types of sludges or waste streams, the solid materials which have been dried by this method may contain heavy hydrocarbon constituents, heavy metals or both. The heavy hydrocarbon constituents may take the form of a solid material at ambient temperatures, resembling asphalt or coke-like material and may exist as a coating over solid particles of heavy metals and other oxidizable compositions.

The apparatus illustrated in the drawing figures and described further herein comprises a unique system for carrying out a unique process in the treatment of slurries or sludges containing both heavy and light or lower boiling fractions of hydrocarbon fluids and other oily substances and solids including particles of heavy metals and other oxidizable substances. Since the oxides of most heavy metals are insoluble in rain or ground waters, the process and apparatus of the present invention provides for distillation and collection of lower boiling temperature oils and water, the combustion of higher boiling temperature hydrocarbons and the oxidation of heavy metals so that the materials returned to the atmosphere are those which naturally occur therein and are usually not considered hazardous.

Referring to the drawing figures, the system of the invention is generally designated by the numeral 9 and includes an arrangement wherein a waste sludge stream, or tanker ballast water stream, for example, may be conducted through a conduit 10 to the inlet of an indirect dryer device 12. The indirect dryer 12 is preferably of a type characterized by a plurality of hollow axially spaced rotating disks 14 which are interposed in a cylindrical housing 16 having an inlet port 18 for receiving the sludge flow stream, a first discharge port 20 for carrying off vapors of liquids which have been vaporized in the dryer, and a second discharge port 22 for discharging dried solids which remain as a result of the drying process. The disks 14 are preferably adapted to have a heated fluid circulated therethrough, said fluid being supplied through a central hollow shaft 24 by way of an inlet 26. The heat exchange fluid is discharged from the shaft 24 at its opposite end through an outlet 28. The relatively large surface area of the disks 14, which define annular drying chambers 29, provides for intimate contact with the material as it progresses through the dryer 12.

The dryer 12 may, in fact, be of a type manufactured by Bepex Corporation, Chicago, Ill., under the trademark TORUSDISC. The dryer 12 is particularly advantageous in that relatively high heat transfer rates are possible and residence time of the material being treated may be controlled by suitable discharge control devices, not shown. In the treatment of sludge streams in accordance with the present invention, the dryer 12 is used preferably in only the indirect dryer mode although it is possible to utilize the dryer in other modes as well. The source of heat exchange fluid which is conducted through the shaft 24 is not shown and various arrangements for providing a heated circulating fluid in accordance with known techniques for operating the dryer 12 may be utilized.

In accordance with the present invention in the process of treating oil-water emulsions or slurries, particularly such waste streams as ballast water which has been discharged from a marine oil tank, the liquids which are boiled off during passage of the stream through the dryer 12 are conducted via a conduit 32 to a condenser 34 which is adapted to have circulated therethrough a condensing fluid by way of heat exchange structure 36 from a source, not shown, wherein condensed fluids from the dryer 12 such as oils and water may be discharged by way of a conduit 38 to a suitable collection vessel 40. The collection vessel 40 may be of a type to provide for separation of a layer of oil 42 from a layer 44 of more dense liquid such as water and wherein the separated oil 42 may be conducted by way of a conduit 46 to a suitable storage or further treatment facility, not shown. Moreover, water separated in the vessel 40 may be conducted by way of a conduit 48 to a further treatment process, if necessary.

The indirect dryer 12 is operated at a material through put flow rate so as to produce substantially dried solids, generally designated by the numeral 52, which are discharged through the port 22 into a conduit 54. The conduit 54 is connected to branch conduits 56 and 58 and is also provided with a suitable diverter valve or gate 60 for controlling the flow of solids into the conduit 58 for a purpose to be described in further detail hereinbelow. The conduit 56 is in communication with a combustor/oxidizer apparatus, generally designated by the numeral 62. A preferred form of combustor/oxidizer apparatus 62 is characterized as a so called lift pipe and includes essentially a vertically oriented, generally cylindrical conduit or stack 64 which is in communication with the conduit 56 at a point slightly above a porous grate or distributor plate 66, see FIG. 2 also.

A forced air plenum chamber 68 is provided in the lift pipe 64 below the plate 66 and is in communication with a source of relatively high volume low pressure air such as a centrifugal or positive displacement blower 70 by way of a conduit 71. A combustion chamber 72 or other suitable air heating device may be interposed in conduit 71 between the blower 70 and the plenum chamber 68. The combustion chamber 72 is provided with a fuel injection nozzle 74 connected to a source of liquid or gaseous fuel 76 by way of a pump 78. The lift pipe 64 includes a discharge duct 78 in communication with the lift pipe at the upper end thereof and also in communication with a suitable solids-gas separator such as a centrifigal or cyclone type separator apparatus 80. The separator 80 includes a gas discharge conduit 82 and a solids discharge conduit 84 in communication with an interior separating chamber 86 by way of a rotary, airlock valve 88. Control of flow of solids 52 into the interior of the lift pipe 64 is maintained by a second rotary, air-lock type valve 89 interposed in the conduit 62, as illustrated.

The sludge treatment system 9 includes means for diverting at least a portion of the solids 52 discharged into the conduit 54 by way of the conduit 58 to a conveyor 90. The conveyor 90 is connected to a conduit 92 which is in communication with the inlet conduit 10 whereby dried, heated solids 52 may be mixed with the incoming sludge flow stream to the dryer 12 to reduce the moisture content of the flow stream before it enters the spaces 29 between the dryer disks 14. In this way the moisture content of the sludge flow stream entering the dryer 12 may be controlled in such a way as to minimize the chance of buildup or caking of solids in the spaces 29 between the disks 14 in which event the efficiency and operability of the dryer 12 can be substantially reduced. For example, it has been discovered in accordance with developing the present invention that some sludge streams include hydrophilic solid substances which tend to cake and adhere to the surfaces of the disks 14 in the spaces 29 thereby seriously reducing the efficiency and operability of the dryer 12. The conveyor 90 is preferably of the axial screw type including a drive motor 96 for driving a conveying screw or auger 98 disposed in an elongated housing 100. Other types of material conveying devices may be used in place of the conveyor 90 for returning at least a portion of the dried solids to the sludge stream inlet conduit 10.

The sludge treatment system 9 may be operated on a substantially continuous basis by introducing the sludge stream through the conduit 10 into the dryer 12. The shaft 24 is rotated to effect rotation of the disks 14 which, together with suitable structure in the dryer 12, provide for progressively moving the sludge stream through the dryer from the inlet port 18 toward the discharge port 22. The heat exchange medium introduced through the inlet shaft 26 is typically at a temperature in the range of 500° F. to 700° F. or greater to provide for boiling of water and other relatively low boiling temperature oils and hydrocarbon fluids. The vapors of these fluids are collected in the interior of the housing 16 and conducted through the discharge port 20 to the condenser 34. Condensate from the vapors boiled off in the dryer 12 is collected in the separator vessel 40 and drawn off from the vessel for further treatment as required. The solids discharged through the port 22 are typically substantially dried and heated to a temperature in the range of the temperature of the heat exchange fluid introduced into the dryer 12. For example, the solids 52 may typically be heated to a temperature of about 700° F., although higher temperatures up to about 1100° F. may be obtainable depending on the quantity of hydrocarbon substances coated on or mixed in with the solids. The process advantageously uses the heat of combustion or oxidation of the hydrocarbon substances to increase the temperatures in the combustor/oxidizer to further enhance the oxidation of all of the solids in the chamber 65. The solids 52 are discharged through the conduit 56 and by way of the control valve 89 into the interior chamber 65 of the lift pipe 62 wherein pressure air at sufficient velocity and flow rate is distributed through the plate 66 to entrain the solids and carry them upward into the discharge conduit 78. If the temperature of the solids 52 is in the range of 700° F. or higher, hydrocarbon substances typically found in refinery waste streams, crude oil storage tanks or marine crude oil tanker tanks can be completely oxidized to produce gaseous combustion products which may be discharged into the atmosphere through the conduit 82 or suitably treated as required. Solids such as heavy metals, free of any hydrocarbon coatings, will also be oxidized to provide substances which are found in the earth's crust and may be returned thereto without further treatment. The solids are separated from the excess air and combustion gases in the chamber 86 and are discharged in a conventional manner through the control valve 88 into the discharge conduit 84.

In the event that residence time in the lift pipe 64 is not sufficient to provide complete oxidation of the hydrocarbons and heavy metals in the solids 52 by mixing with air or other oxygen containing or oxygen enriched gases at the temperature of the solids as they enter the chamber 65, the air supplied to the plenum 68 may be preheated by, for example, combustion of a suitable liquid or gaseous fuel in the combustion chamber 72. Other means of preheating the air entering the plenum 68 may be provided interposed between the blower 70 and the lift pipe 64.

If it is indicated that the moisture content and the solids content of the sludge stream entering the dryer 12 is such as to tend to create caked or clogged passages 29 in the dryer, a portion of the dried solids 52 may be recirculated by positioning the diverter valve 60 so as to divert a portion of the dried solids flowstream back to the inlet conduit by way of the branch conduit 58, the conveyor 90 and the conveyor discharge conduit 92. This recycling of dried heated solids will have the effect of reducing the moisture content of the incoming sludge stream introduced into the dryer 12 to reduce the possibility of caking of some types of solids such as hydrophilic clays on the disks 14.

Although preferred embodiments of the method and apparatus of the present invention have been described herein, those skilled in the art will recognize that certain modifications may be made in the system. For example, if the quantity of solids being treated by the combustor/oxidizer is such that residence time, in order to achieve fully hydrocarbon free and oxidized solids, is insufficient as provided by the lift pipe 62, that suitable other types of combustor/oxidizers may be provided, including fluidized bed devices, traveling grate devices and modifications of certain types of direct and indirect dryer apparatus. However, the vertical lift pipe type combustor/oxidizer is particularly well suited to use with treatment of refinery waste streams and other sludges from crude oil storage tanks and transport vessels, for example, particularly when considering the types and particle size of the solids present in these streams. Moreover, in the event that the particle sizes encountered in these sludge streams, which typically range up to about ¼ inch nominal maximum dimension, include smaller fines, the excess air, combustion gases and entrained solid particles discharged through the conduit 82 may be subjected to a further treatment process in accordance with the teachings in my U.S. patent application Ser. No. 727,311, now U.S. Pat. No. 4,683,963 filed Apr. 25, 1985, and assigned to the assignee of the present invention.

Although preferred embodiments of the method and system of the present invention have been described in detail herein, those skilled in the art will recognize that various substitutions and modifications may be made to the specific embodiments described without departing from the scope and spirit of the invention as recited in the appended claims.

What I claim is:

1. A method for treating a sludge stream comprising a quantity of solids particles including particles of heavy metals and heavy hydrocarbon substances which are coated on said solids including said heavy metals, said method comprising the steps of:

providing a dryer apparatus for receiving said sludge stream and including means for discharging vapors of liquids boiled off in said dryer, means for discharging solids comprising particles dried in said dryer and heat exchange surface means operable to dry said sludge substantially only by contact with said sludge such that substantially only dried solids of said sludge are discharged by said means for discharging solids and substantially only vapors of said liquids are discharged through said means for discharging vapors;

providing oxidizer means for receiving dried solids and exposing said dried solids to an oxygen containing gas;

introducing said sludge stream into said dryer and heating said sludge stream to evaporate substances having a boiling point less than about 700° F.;

discharging vapors generated in said dryer from heating said sludge stream in said dryer;

discharging dried solids from said dryer and introducing said dried solids to said oxidizer means;

subjecting all of said dried solids in said oxidizer means to an oxygen-containing gas by passing a gas flow stream through said oxidizer means at a sufficient flow rate to thoroughly mix said dried solids and oxidize hydrocarbons coated on said dried solids having a boiling temperature greater than about 500° F. and to reduce the portion of said dried solids which comprise heavy metals selected from a group consisting of chromium, vanadium and nickel, to oxides of said heavy metals;

conducting gases from said oxidizer means; and conducting substantially hydrocarbon free, oxidized and dried solids from said oxidizer means for disposal.

2. The method set forth in claim 1 including the steps of:

introducing said gas flow stream and entrained dried solids into a separator from said oxidizer means and separating combustion gases and excess air in said flow stream from said dried solids, and discharging said dried solids from said separator for disposal.

3. The method set forth in claim 1 including the step of:

diverting a portion of the dried solids discharged from said dryer and conducting said portion of dried solids back to the inlet to said dryer for reducing the moisture content of said sludge steam entering said dryer.

4. The method set forth in claim 1 wherein:

said dried solids are exposed to said gas flowstream at a temperature of said dried solids in the range of about 700° F. to 1100° F.

5. A method for treating a sludge stream comprising a quantity of solids particles including particles of heavy metals and heavy hydrocarbon substances which are coated on said solids including said heavy metals, said method comprising the steps of:

providing a dryer apparatus for receiving said sludge stream and including means for discharging vapors of liquids boiled off in said dryer, means for discharging solids comprising particles dried in said dryer and heat exchange surface means operable to dry said sludge substantially only by contact with said sludge such that substantially only dried solids of said sludge are discharged by said means for discharging solids and substantially only vapors of said liquids are discharged through said means for discharges vapors;

providing a combustor/oxidizer apparatus for receiving dried solids and including means for discharging said dried solids from said combustor/oxidizer apparatus;

introducing said sludge stream into said dryer and heating said sludge stream to evaporate substances having a boiling point less than about 700° F.;

discharging vapors generated in said dryer from heating said sludge stream in said dryer and condensing said vapors;

discharging dried solids from said dryer and introducing all of said dried solids to said combustor/oxidizer;

subjecting said dried solids in said combustor/oxidizer to an oxygen-containing gas flow stream by passing said gas flow stream through said combustor/oxidizer at a sufficient flow rate to lift said dried solids, thoroughly mix said dried solids and oxidize hydrocarbon substances coated on said dried solids and to reduce any of said dried solids which comprise heavy metals selected from a group consisting of chromium, vanadium, and nickel, to oxides of said heavy metals and wherein said dried solids are at a temperature in the range of about 700° F. to 1100° F. in said combustor/oxidizer;

conducting gases from said combustor/oxidizer; and conducting substantially hydrocarbon free, oxidized and dried solids away from said combustor/oxidizer for disposal.

6. The method set forth in claim 5 including the step of:

diverting a portion of the dried solids discharged from said dryer and conducting said portion of dried solids back to the inlet to said dryer for reducing the moisture content of said sludge stream entering said dryer.

7. The method set forth in claim 1 including the steps of:

providing oxidizer means as a substantially vertical lift pipe and said gaseous flow stream comprising air, and introducing said gaseous flow stream to said lift pipe by pressure air supply means for exposing said dried solids to a high velocity turbulent air flow stream to oxidize heavy hydrocarbons coated on said dried solids and reduce said heavy metals to oxides thereof.

* * * * *